(12) United States Patent
Shamma et al.

(10) Patent No.: US 8,396,874 B2
(45) Date of Patent: Mar. 12, 2013

(54) SYSTEM AND METHOD FOR USING TOPIC MESSAGES TO UNDERSTAND MEDIA RELATING TO AN EVENT

(75) Inventors: David Ayman Shamma, San Francisco, CA (US); Lyndon Kennedy, Santa Clara, CA (US); Elizabeth F Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 486 days.

(21) Appl. No.: 12/707,109

(22) Filed: Feb. 17, 2010

(65) Prior Publication Data

US 2011/0202537 A1 Aug. 18, 2011

(51) Int. Cl.
*G06F 7/00* (2006.01)
*G06F 17/30* (2006.01)
(52) U.S. Cl. ......................... 707/741; 707/769
(58) Field of Classification Search ................. 707/741
See application file for complete search history.

(56) References Cited

U.S. PATENT DOCUMENTS

| 7,624,416 | B1* | 11/2009 | Vandermolen et al. | 725/109 |
|---|---|---|---|---|
| 2007/0168533 | A1* | 7/2007 | Canright et al. | 709/230 |
| 2008/0147575 | A1* | 6/2008 | Roy | 706/12 |
| 2010/0312769 | A1* | 12/2010 | Bailey et al. | 707/740 |
| 2010/0325081 | A1* | 12/2010 | Helms et al. | 706/52 |

* cited by examiner

*Primary Examiner* — Fred I Ehichioya
*Assistant Examiner* — Kris Mackes
(74) *Attorney, Agent, or Firm* — James J. DeCarlo; Greenberg Traurig, LLP

(57) ABSTRACT

A system and method for using topic messages to understand media relating to an event. An event (such as a live event or broadcast event), is selected where at least a portion of the content of the event is stored as at least one media object, such as, for example a video or audio recording in digital format. A plurality of topic messages relating to the broadcast event is retrieved over a network and are analyzed to identify a plurality of content segments within the event. The topic messages are further analyzed to identify at least one key actor related to the event. Segment and key actor data relating to the event is stored to a computer readable medium in association with the media objects, whereby the segment data identifies the plurality of content segments within the media objects and the key actor data identifies key actors in the event.

31 Claims, 9 Drawing Sheets

SYSTEM AND METHOD FOR USING TOPIC MESSAGES TO UNDERSTAND MEDIA RELATING TO AN EVENT

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for analyzing the content of media relating to events (such as broadcast events) and, more particularly, to systems and methods using for using topic messages, such as social status messages relating to an event, for understanding media relating to the event.

BACKGROUND OF THE INVENTION

Web applications that allow people to converse about media content have become popular online. Such applications ranges from photo sharing websites with easy uploading from mobile devices, to micro-blogging sites where short status messages are shared and broadcast to the world, such as the Twitter microblogging service. The popularity of social status and short messaging services is rising. More and more frequently users are using social status messaging services to discuss live events (in particular media events), which they are attending or watching on broadcast TV. Unlike other sites where we see media stored and discussed, the media is stored externally, if at all, while the conversation ensues on the messaging services. This disembodied social conversation happens as people share their awareness and comments around an event. The social structure and the conversational content of these short messages can provide insights into the event's structure and semantic content of the video sources they annotate.

SUMMARY OF THE INVENTION

In one embodiment, the invention is a method. An event (such as a live event or broadcast event), is selected, using at least one computing device where at least a portion of the content of the event is stored as at least one media object, such as, for example a video or audio recording in digital format. A plurality of topic messages relating to the broadcast event is retrieved over a network, such as the Internet, from at least one topic message source. The plurality of topic messages is analyzed, using at least one computing device, the to identify a plurality of content segments within the event. Segment data relating to the plurality of content segments identified within the event is stored to a computer readable medium, wherein the segment data is stored in association with the media objects, whereby the segment data identifies the plurality of content segments within the media objects.

In a related embodiment, the method comprises additional steps. The plurality of topic messages are analyzed, using the computing device, to identify at least one key actor related to the event. Key actor data relating to the key actor in the events are stored to the computer readable medium, in association with the media objects, whereby the key actor data identifies the key actors in the event.

In another embodiment, the invention is a system composed of multiple modules. Each module comprises one or more processors programmed to execute software code retrieved from a computer readable storage medium for various functions. The system includes: an event identification module for selecting events, wherein at least a portion of the content of each event is stored as at least one media object; a status message retrieval module for retrieving, over a network, a plurality of topic messages relating to each event selected by the event identification module from at least one topic message source; a topic message analysis module for analyzing, for each of the events selected by the event identification module, the plurality of topic messages relating to the respective event so as to identify a plurality of segments within the broadcast event; an event data storage module comprising one or more processors programmed to execute software code retrieved for storing, for each of the broadcast events selected by the event identification module, segment data relating to the plurality of segments identified within the respective events to a computer readable medium, wherein the segment data is stored in association with the at least one media object that stores content for the respective event, whereby the segment data identifies the plurality of content segments within the media object.

In a related embodiment, the topic message analysis module is further configured to: analyze, for each of the events selected by the event identification module, the plurality of topic messages relating to the respective broadcast event so as to identify at least one key actor in the respective broadcast event; and the event data storage module is further configured to store, for each of the broadcast events selected by the event identification module, key actor data relating to the key actors in the respective event to a computer readable medium.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
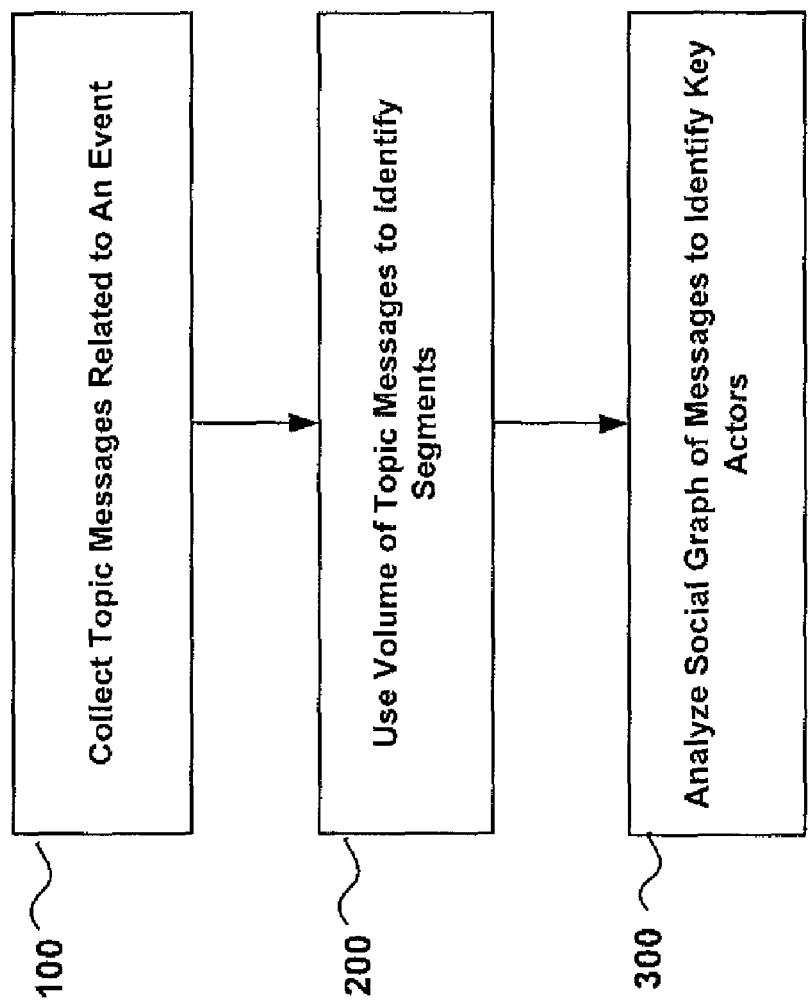
FIG. 1 illustrates a high-level view of one embodiment of a method for using topic messages for understanding the structure and content of media relating to broadcast or live events.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure, a computer readable medium stores computer data in machine-readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

For the purposes of this disclosure an event is a live or broadcast event that is experienced simultaneously by a number of users. Such event could include, for example, a debate, a sporting event, a television or webcast program, a movie, a concert and so forth. An event may be broadcast in real-time or on a time delay For the purposes of this disclosure a topic message is a short electronic message or comment (e.g. 140 characters or less, as in the Twitter microblogging service) relating to a topic (such as an event) entered into a messaging service such that the message is visible to at least one other user over a network, such as the Internet. Such messages may be private (e.g. directed to, and only visible to another specific user or users), or may be public (e.g. visible to all members of the service). Topic messages can relate, without limitation, to an event, a person, or any other topic of discussion. A messaging service can be defined as any kind of service that allows users to enter topic messages into the service. Social status messages within a social networking site and posts within a microblogging service can be topic messages.

The present invention is directed to systems and methods for using topic messages for understanding the structure and content of media relating to broadcast or live events. In one embodiment, topic messages are used for segmentation and key actor identification of such events. In particular, topic message volume over time can be used to determine segmentation points as delimited by level of interest (LOI).

FIG. 1 illustrates a high-level view of one embodiment of a method for using topic messages for understanding the structure and content of media relating to broadcast or live events. Initially, topic messages relating to a broadcast or live event are collected 100. The volume of the topic messages are then used to identify segments 200 in the event. The social graph of the users referenced in the topic messages then is determined 300 and can be used to identify key actors in the event.

Topic messages referring or relating to an event could be collected from one or more messaging services during a live event, during its broadcast and/or the event's rebroadcast. Such collection could occur in real-time (i.e. while the event is taking place), or any time after the event if topic messages are retained by the message service. Such services could include microblogging services such as the Twitter messaging service, and/or could include topic messages from any other service, such as any other social networking service or other type of hosted online discussion. Messages could be retrieved using any method known in the art, including APIs supplied by the messaging service. For example, Twitter provides an API to retrieve message data (subject to volume and other limitations).

Topic messages relating to a broadcast event can be identified using any techniques known in the art. For example, in the case of Twitter, messages can include tags that indicate a given message is part of a dialogue relating to a broadcast event. Such messages could be retrieved, for example, search or crawler script which could query for specific tags or other types of tokens or other identifying indicia within in or associated with topic messages.

Message volume shows activity on its network, and, hence, can be a proxy of interest. When examined over time, areas of high and low activity, spikes and pits, can be detected in the traffic volume. In one embodiment, first, a discrete function of time in minutes can be defined that returns the sum of topic messages during that minute. This function is then smoothed using a sliding window of fixed duration, for example, three minutes. Each point is expressed as the average of itself and its two surrounding neighbors. In one embodiment, the peaks in the volume of topic messages can be determined using Newton's Method.

Newton's Method is a simple approach for extrema detection, which detects a point of change in the slope (roots of the first derivative) of a given function: a change from a positive to a negative slope indicates a local maximum, and a change from negative to positive indicates a minimum. This approach on smoothed topic message data can be sensitive to smaller fluctuations and dips in activity within small time scales. In one embodiment, the set of detected extrema can be filtered to include only outliers that are one standard deviation away from the mean, $\mu+\sigma$, as measured in a fixed sliding window to the activity volume. Such methods may be dependent on the type of media event.

The social graph of the users referenced in the topic messages the network can provide additional information such as, for example, key participants in the event. In one embodiment, topic messages may be initially regarded as an undirected collection of users and tags. In one embodiment, it can be assumed users are using tags specific to a given media event, and, possibly a few other related tags. In one embodiment, tags may be examined as boundary objects between users and may be clustered in distinct groups.

In one embodiment, users associated with an event can be determined by explicit call outs or user mentions in topic messages. In one embodiment, key participants in the event can be identified by measuring the size and depth of users social networks. In one embodiment, such a metric is the eigenvector centrality (EVC) which is defined as the principle eigenvector of the adjacency matrix. A user will have a high EVC if they are connected to a set of users who, in turn, are connected. Users with high EVC are more likely to be key actors in the associated media event.

Analysis of media using the techniques described above could be used to enhance web search services as well as enhance media presentation services. In one embodiment, such techniques could be used to determine key actors associated with media objects relating to broadcast events, as well as to identify topical segments within media objects. Such data could be stored in association with the media objects and could be used by, for example, a web search to more effectively index the media objects, allowing, for example, media objects relating to specific actors to be more effectively identified.

Such data could be used for more effective media presentation by, for example, a streaming media service. The data could allow users to jump to individual segments within a media object relating to a broadcast event. Such data could be further enhanced by utilizing additional data sources, such as closed captioning data or interactive outlines of events to associate specific topics or keywords with individual segments.

An Example Using Data from a Presidential Debate in 2008

In October of 2008, Current TV conducted a "Hack The Debate" event for the first 2008 Presidential Debate. In the event, the debate was broadcast live on TV. A specific tag was defined for Twitter messages ("tweets") "#current", such that Twitter messages including the "#current" tag were displayed in real-time or near-time within the broadcast, thereby allowing Twitter users to comment on the debate. A number of Twitter users also used tags "#tweetdebate" and "#debate08", although such tags were not officially included in the "Hack the Debate" campaign.

Data relating to the "Hack the Debate" event was gathered from Twitter in November of 2008. At that time, Twitter had rate and time limits on usage of its API. Each search was limited to 100 messages ("tweets"). To get a clean sample, a search/crawler script was created which would query for all tweets with any of the three aforementioned tags for each minute of the debate. The crawler was configured to paginate the search results and serialize them to disk or a database. Search results only included tweets from the public timeline—not private and visible to everyone. 150 minutes of tweets were obtained, the first 97 minutes being the actual debate airing, the remainder being captured to examine post-debate activity.

The speakers during the debate were Senator John McCain, Senator Barack Obama, and the debate was moderated by Jim Lehrer who anchors the PBS News Hour TV show. At the time of the debates, their Twitter accounts were @johnmccain@barackobama, and @newshour. There were 3,238 tweets from 1,160 people. There were 1,824 tweets from 647 people during the actual debate. After the debate 1,414 tweets from 738 people were found. For the 2.5 hours 577 @ user mentions were found. There were 266 mentions during the debate and 311 afterwards.

Figure 2:
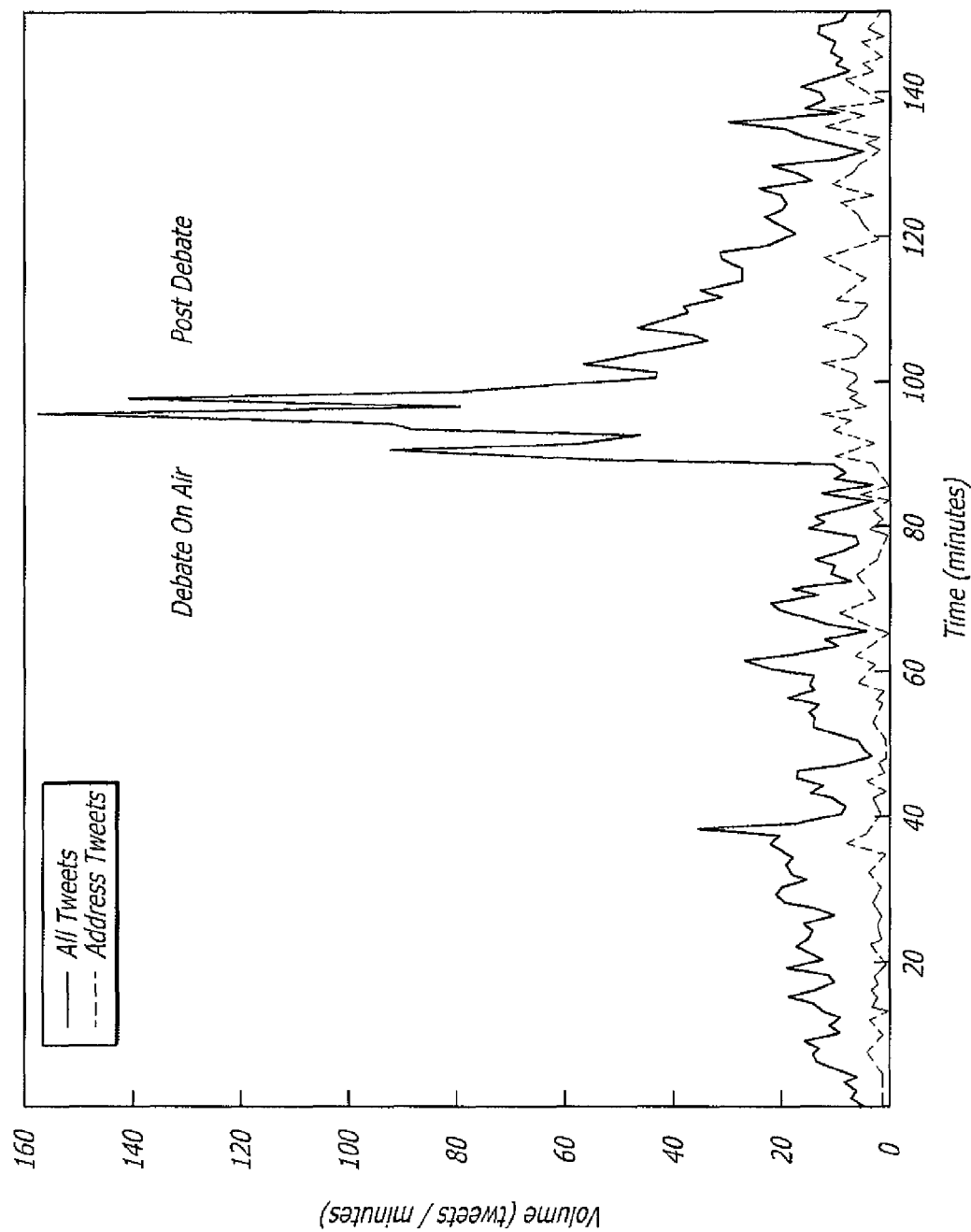
FIG. 2 illustrates the volume of posts to a microblogging service over time relating to a media event, Debate 2008.

The volume of tweets over time is shown in FIG. 2. The debate aired from minute 0 to minute 97. The swell of conversation, the shaded region, occurred mostly after the debate had ended. The blue/solid line shows the total tweets. The red/dashed line shows the volume of @user mentions. When examined over time, areas of high and low activity, spikes and pits, are clearly visible in the traffic volume. Twitter volume increased sharply at the end of the debate. It was also found the amount of @user mentions remains fairly low but increased towards the end of the debate along with the total volume. However, the mention volume did not spike and fall as sharply as the overall volume.

To find actual segments, a discrete function of time in minutes which returned the sum of tweets during that minute was defined. This function was then smoothed using a three minute sliding window, where each point is expressed as the average of itself and its two surrounding neighbors. To automatically detect peaks in the volume of Twitter activity, Newton's Method was applied to the data. This approach on smoothed twitter data is sensitive to smaller fluctuations and dips in activity at small time scales. To address this, the set of detected extrema were filtered to only include the outliers which are one standard deviation away from the mean, $\mu+\sigma$, as measured in a 21-minute sliding window to the activity volume. This method returned 11 segmentation markers for the 97 minute debate. See FIG. 3.

Figure 3:
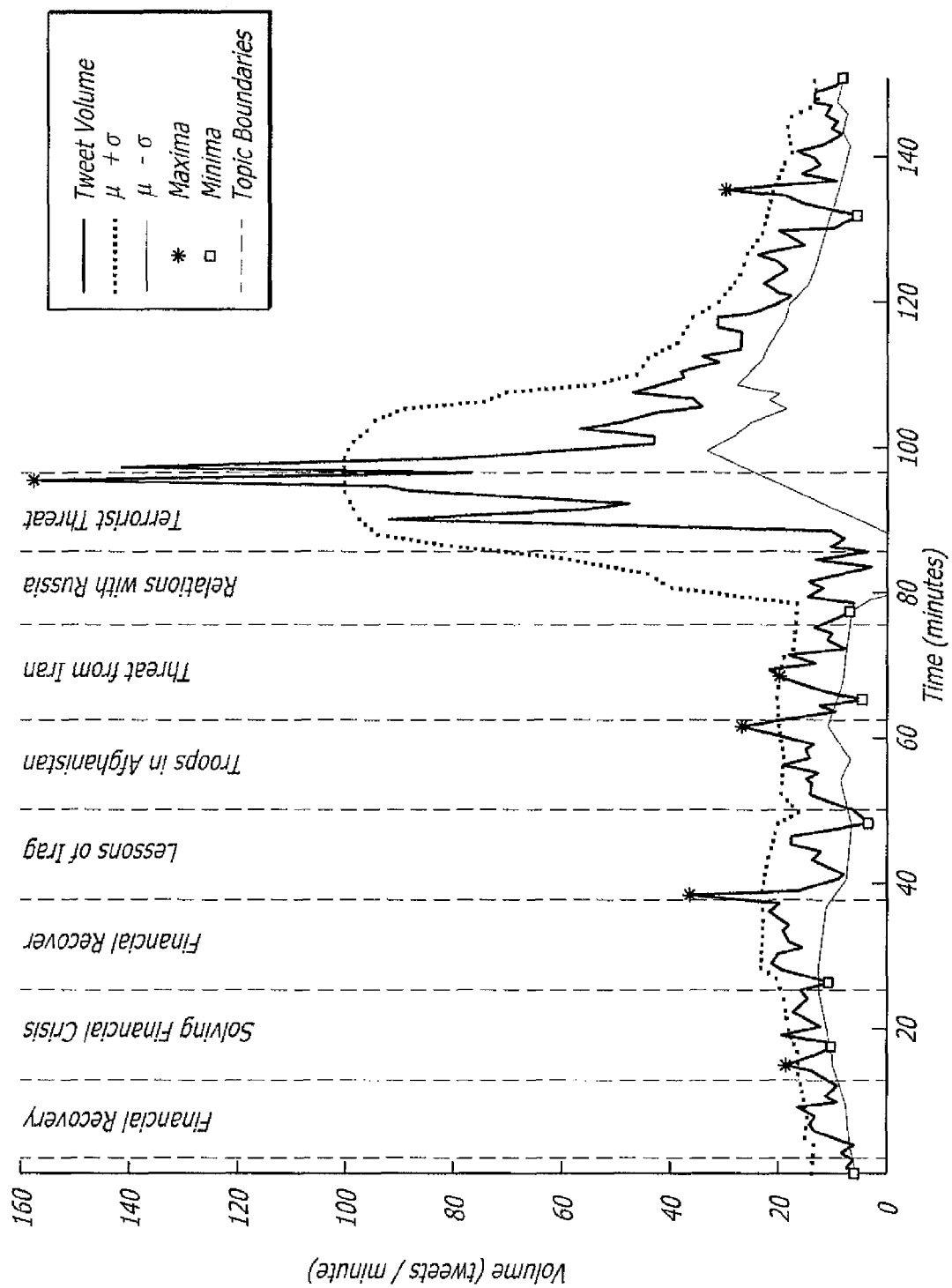
FIG. 3 illustrates the segmentation of the Debate 2008 sample using various segmentation techniques described herein.

The volume data is compared in FIG. 3 to an interactive timeline of the debate available from C-SPAN which timestamps high-level topic areas, including:

Opening
Financial Recovery
Solving Financial Crisis
Lessons of Iraq
Troops in Afghanistan
Threat from Iran
Relations with Russia
Terrorist Threat.

In FIG. 3, each vertical region represents segments as described from C-SPAN. The dotted line above and below the curve is $\mu\pm\sigma$ from a 21-minute moving window.

Figure 4:
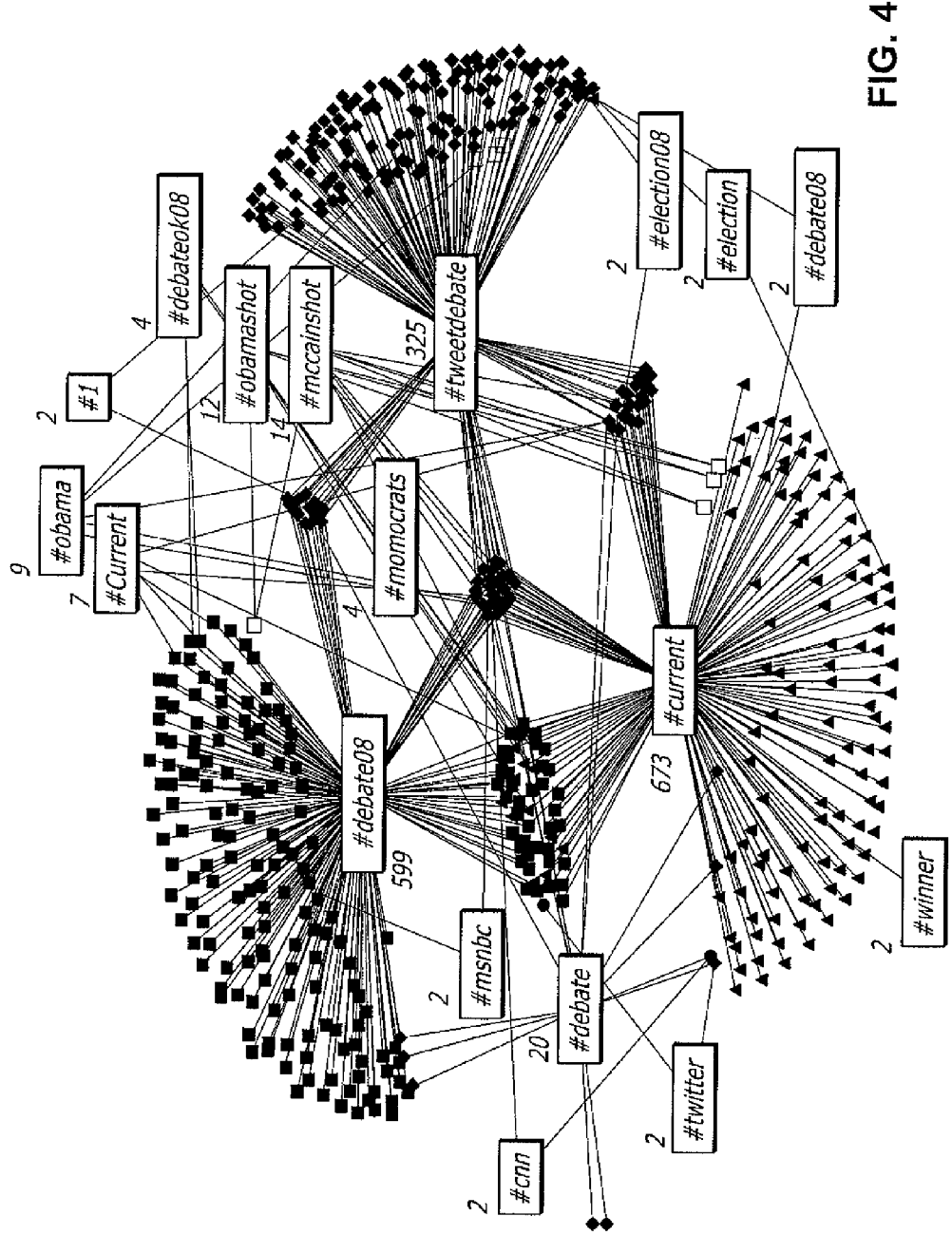
FIG. 4 illustrates the network graph of all users and their tag relations from the Debate 2008 sample as seen when clustered by tags.

The Twitter network was first examined as an as an undirected collection of users and tags. It was assumed that users would be using the "#current" tag and possibly one of the other two tags "#debate08" or "#tweetdebate", however, when tags were examined as boundary objects between people, distinct groups with some overlap were seen. See FIG. 4 which illustrates the network graph of all users and their tag relations from the Debate 2008 sample as seen when clustered by tags. The number next to each #tag denotes the degree of that node. Only tag node degrees ≧2 are shown for clarity. The betweenness centrality of "#current" is 1.0; "#debate08" and "#tweetdebate" scored 0.892 and 0.499 respectively. During the debate, 48.8% of the users did not use the "#current tag". This shows the practice of live tweeting of this event was not limited to the Current TV campaign.

Figure 5:
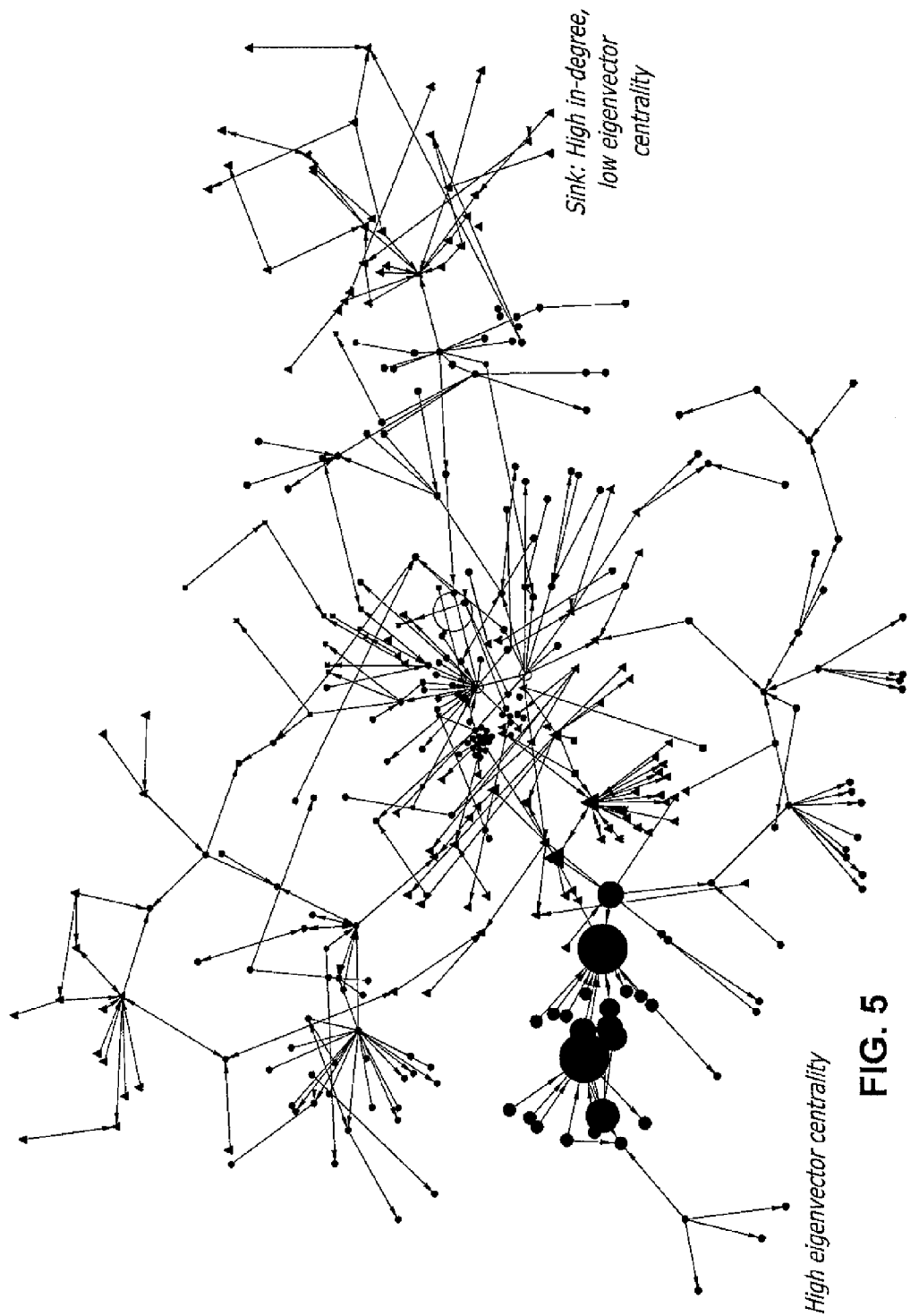
FIG. 5 illustrates the directed network of Twitter users @mentions in the Debate 2008 sample

To find important nodes (people) within the network, the eigenvector centrality was of the sample examined, where the EVC was defined as the principle eigenvector of the adjacency matrix. The EVC was computed using the accelerated power method. FIG. 5 illustrates the directed network of Twitter Users @mentions. Larger sizes denote a higher eigenvector centrality, shapes denote clusters. To the left, a clustered region of high eigenvector centrality includes Twitter accounts from Barack Obama, John McCain and Jim Lehrer. To the right, a sink is a node with a high in degree but low eigenvector centrality. Out of all the mentions in the 2.5 hour sample, 10.23% were reciprocated.

Figure 6:
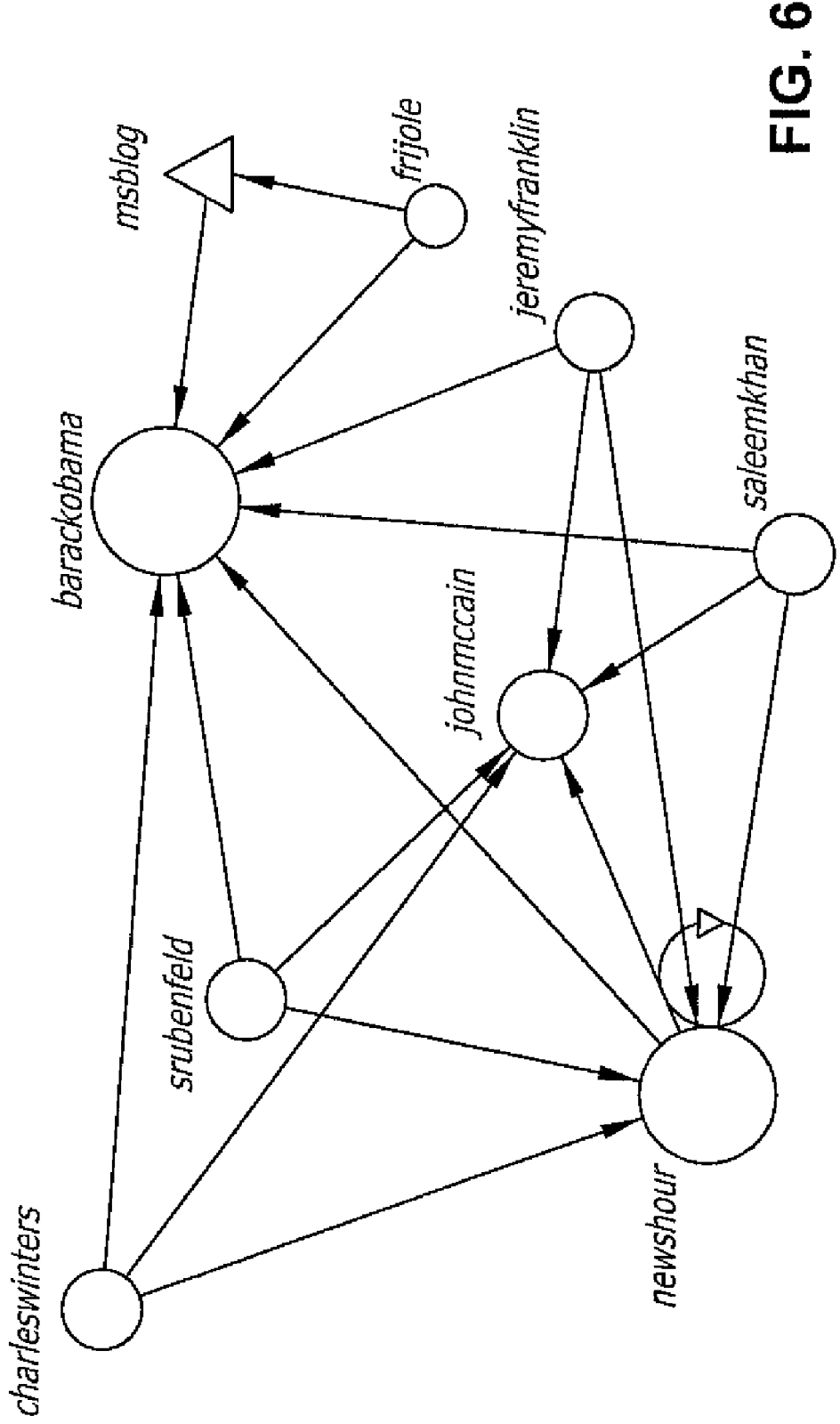
FIG. 6 shows the subgraph of Twitter users from FIG. 5 with the highest eigenvector centrality. The top three users were the three people in the debate: two candidates and the moderator. @newshour contained a self-referential tweet where they mentioned themselves.

Within the graph, the top three nodes with a highest EVC were the three people in the debate: @barackobama 0.472, @newshour 0.427 (Moderator Jim Lehrer), and @johnmccain 0.277. See FIG. 6 showing the subgraph of Twitter users from FIG. 5 with the highest eigenvector centrality. The top three users were the three people in the debate: two candidates and the moderator. @newshour contained a self-referential tweet in which they mentioned themselves.

Figure 7:
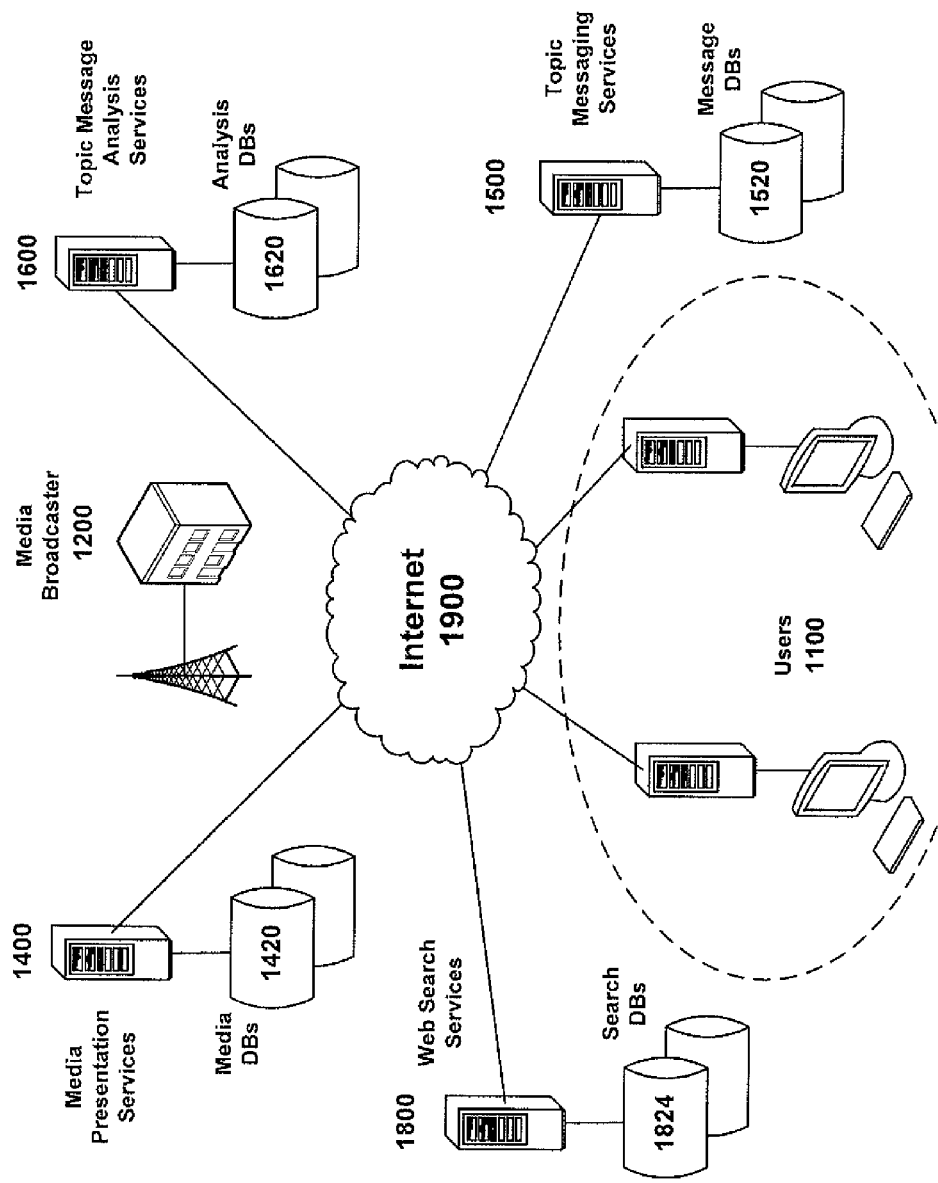
FIG. 7 illustrates one embodiment of a system capable of supporting at least one embodiment of the systems and methods described herein.

FIG. 7 illustrates one embodiment of a system 1000 capable of supporting at least one embodiment of the systems and methods described herein.

Events are broadcast, either in real-time, or on a delay, to users 1100 by a media broadcaster 1200 and/or other media presentation services provider 1400, such as, for example, a streaming media service. Users 1100 may also attend live events (not shown). Users 1100, in turn, issue topic messages simultaneously, or nearly simultaneously with the events in which the users comment on the events. In one embodiment, users 1100 issue such topic messages using one or more status messaging services 1500 such as, for example, Twitter or Facebook.

A topic message analysis service 1600 retrieves topic messages relating to events from the topic messaging services 1500 using any technique known in the art such as, for example, using a crawler script executing an API provided by the service provider. The messages can then be analyzed using techniques as those described herein to identify segments within the media as well as key actors within the events. The results of the analysis can then be stored on databases 1620 maintained by the topic message analysis service 1600. This data can then be utilized by media presentation services 1400 and/or web search services 1800 to index and categorize media objects relating to the events.

Note that one or more of each of the broadcast 1200, presentation 1400, analysis and search services could be provided by a single service provider, or each could be provided by a separate service provider. Such services could be provided using one or more servers operatively connected to one another through, without limitation, a local network, a wide area network or the Internet 1900.

Figure 8:
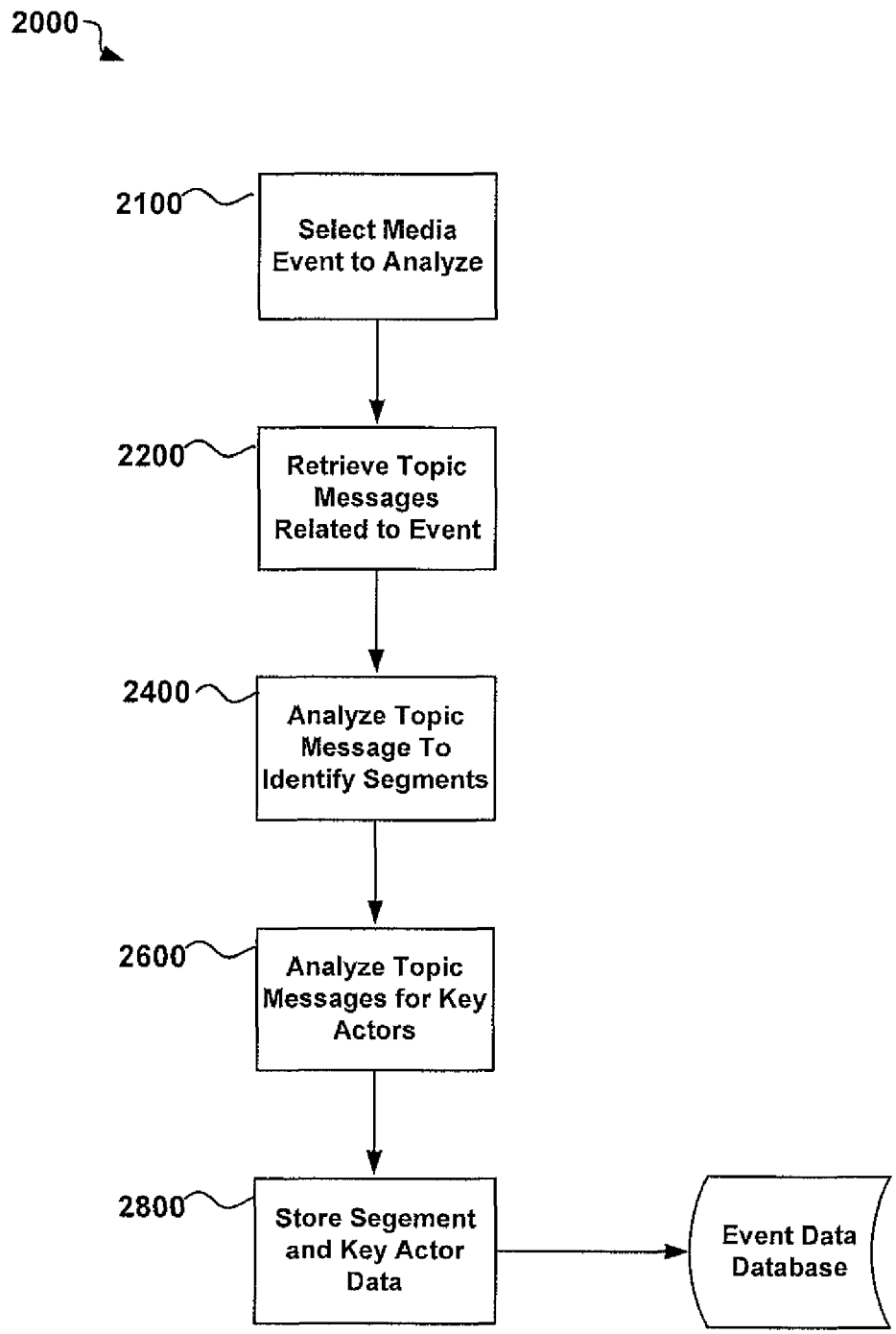
FIG. 8 illustrates one embodiment of a process for using topic messages to understand media relating to an event.

FIG. 8 illustrates one embodiment of a process 2000 for using topic messages to understand media events.

A media event or live is selected 2100 for analysis of topic messages relating to the event, wherein at least a portion of the content of the event is stored as at least one media object. The event could be selected manually, using at least one computing device, by a user employed by a Topic Message Service provider. Additionally, or alternatively, such events could be automatically selected based on one or more selection criteria. For example, all events broadcast by a specific television channel might be selected and/or all events for which a Twitter campaign is being hosted (such as the 2008 debate could be selected. Media objects storing event content could be any type of multimedia object, such as audio files or video files.

Topic messages relating to the event are then retrieved 2200 from at least one topic message source. Such sources could include microblogging services such as the Twitter messaging service, and/or could include any other service, such as any other social networking service or other type of hosted online discussion that provides topic message services. Messages could be retrieved using any method known in the art, including APIs supplied by the topic message source. In one embodiment, messages associated with at least one identifier relating to the media event are retrieved. In one embodiment, such identifiers could comprise a tag placed within the text of the message.

The topic messages can then be analyzed 2400, using the computing device, to identify segments within the event. In one embodiment, segments are identified using extrema in the volume of topic messages relating to the event. In one embodiment, peaks are identified using a discrete function of time in a fixed time interval, for example, one minute that returns the sum of topic messages during that interval. In one embodiment, such a function can smoothed using a sliding window of fixed duration, for example, three minutes, where each point is expressed as the average of itself and its two surrounding neighbors. In one embodiment, the extrema in the volume of topic messages can be determined using Newton's Method. In one embodiment, the set of detected extrema can be filtered to include only outliers that are one standard deviation away from the mean, $\mu+\sigma$, as measured in a fixed sliding window to the activity volume.

The topic messages can be further analyzed 2600, using the computing device, 2600, to identify key actors in the media event. In one embodiment, key actors are identified by determining the eigenvector centrality of users mentioned in the topic messages. In one embodiment, the eigenvector centrality is defined as the principle eigenvector of the adjacency matrix of users known to the topic message source. In one embodiment, eigenvector centrality is computed using the accelerated power method. In one embodiment, only segments in the event are identified. In one embodiment, only key actors in the event are identified.

Data relating to segments and key actors identified with the event can then be stored on a computer-readable medium in association with media objects relating to the event. In one embodiment, such data is stored on a database for 2800 for future use by other services. For example, a web search service could use data relating to key actors in the event to index media objects embodying the event by actor (e.g. a media object relating to the Campaign 2008 event could be indexed by the debate participants). In another example, a media presentation service could use segment data to allow users to view individual segments of an event embodied in a media object.

Additional data relating to the event could be obtained from other services and stored in association with the data relating to segments and key actors. For example, close-captioning data for the event could be stored or summarized for each segment identified for an event.

Figure 9:
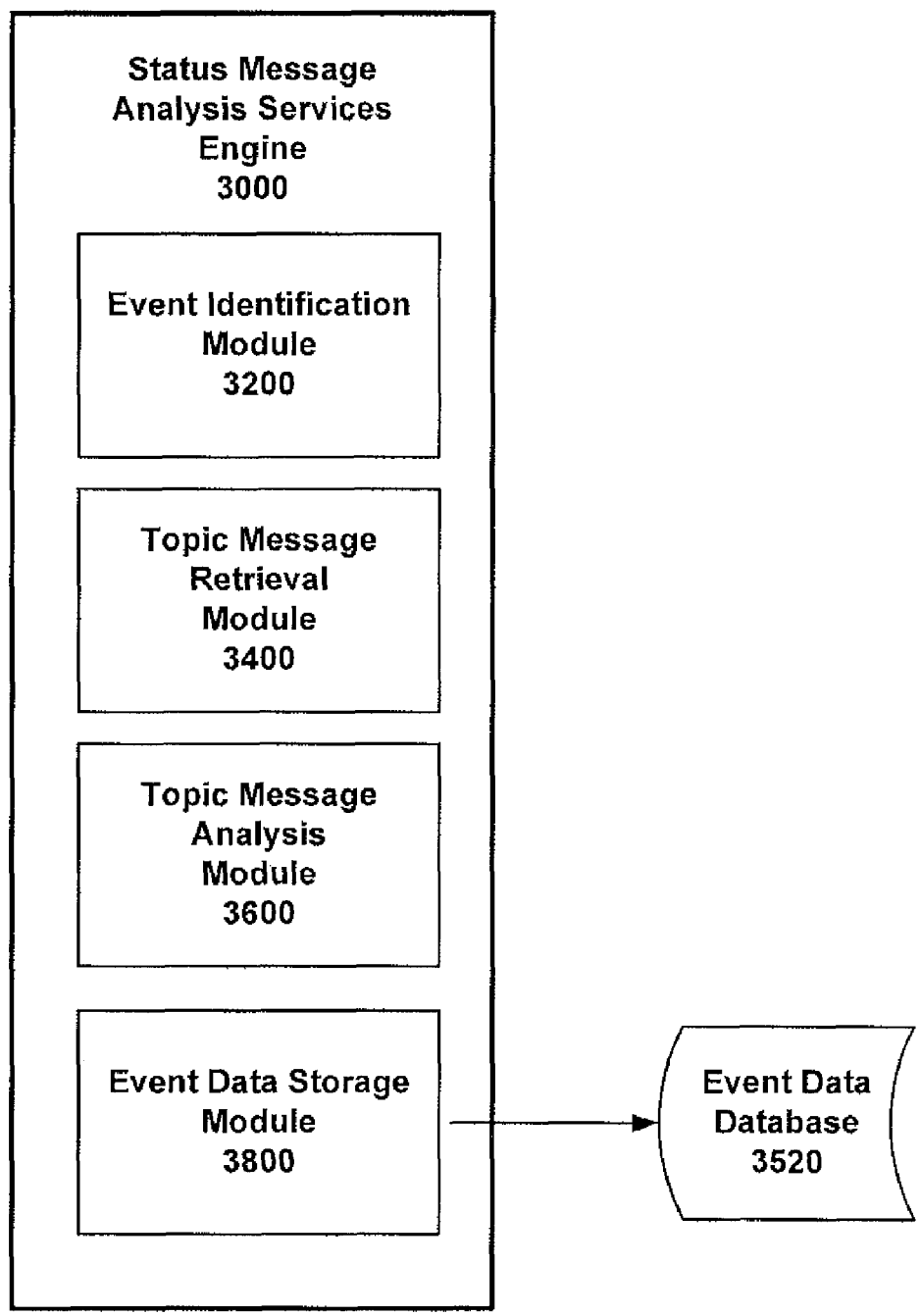
FIG. 9 illustrates one embodiment of a topic message analysis services engine capable of supporting at least one embodiment of the process described in FIG. 8.

FIG. 9 illustrates one embodiment of a topic message analysis services engine 3000 capable of supporting at least one embodiment of the process described in FIG. 8 above. In one embodiment, the web search services engine 3000 comprises an event identification module 3200, a topic message retrieval module 3400, a topic message analysis module 3600, and an event data storage module 3800. In one embodiment, the topic message analysis services engine 3000 is hosted on one or more servers hosted by a service provider, such as the topic message analysis servers 1600 shown in FIG. 1.

In one embodiment, each of the modules comprise one or more processors programmed to execute software code retrieved from a computer readable storage medium storing software for functions as described below. In one embodiment, each of the modules could be hosted on one or more servers hosted by a service provider, such as the service 1600 shown in FIG. 1. Such an embodiment is purely exemplary, and all of the modules shown could be implemented in any combination on any number servers, as will be readily apparent to those skilled in the art.

In one embodiment, the event identification module 3200 is configured to select events for analysis of topic messages relating to the events, wherein at least a portion of the content of each event is stored as at least one media object. The module may provide facilities to allow users to select events manually, such as via a user interface. Additionally, or alternatively, the module can be configured to automatically select media events based on one or more selection criteria. For example, all events broadcast by a specific television channel might be selected and/or all events for which a Twitter campaign is being hosted (such as the 2008 debate) could be selected.

In one embodiment, the topic message retrieval module 3400 is configured to retrieve topic messages relating to selected events from at least one topic message source. Such sources could include microblogging services such as the Twitter messaging service, and/or could include any other service, such as any other social networking service or other type of hosted online discussion that provides topic message services. Messages could be retrieved using any method known in the art, including APIs supplied by the topic message source. In one embodiment, messages associated with at least one identifier relating to selected media events are retrieved. In one embodiment, such identifiers could comprise a tag placed within the text of the message.

In one embodiment, the topic message analysis module 3600 is configured to analyze topic messages retrieved by the topic message retrieval module 3400 to identify segments within the events to which such messages relate. In one embodiment, segments are identified using extrema in the volume of topic messages relating to the events. In one embodiment, peaks are identified using a discrete function of time in a fixed time interval, for example, one minute, that returns the sum of topic messages during that interval. In one embodiment, such a function can smoothed using a sliding window of fixed duration, for example, three minutes, where each point is expressed as the average of itself and its two surrounding neighbors. In one embodiment, extrema in the volume of topic messages can be determined using Newton's Method. In one embodiment, the set of detected extrema can be filtered to include only outliers that are one standard deviation away from the mean, $\mu \pm \sigma$, as measured in a fixed sliding window to the activity volume.

In one embodiment, the topic message analysis module 3600 is further configured to identify key actors in media events. In one embodiment, key actors are identified by determining the eigenvector centrality of users mentioned in the status messages retrieved by the topic message retrieval module 3400. In one embodiment, the eigenvector centrality is defined as the principle eigenvector of the adjacency matrix of users known to the topic message source. In one embodiment, eigenvector centrality is computed using the accelerated power method.

In one embodiment, the event data storage module 3800 is configured to store data relating to segments and key actors, wherein the data is stored in association with the media objects that stores content for the respective event, whereby the segment data identifies the plurality of content segments within the media objects and the key actor data identifies key actors in the event.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
   selecting, using a computing device, an event, such that at least a portion of the content of the event is stored as a media object;
   retrieving, over a network, a plurality of topic messages relating to the event from a plurality of topic message sources;
   analyzing, using the computing device, the plurality of topic messages to identify a plurality of content segments within the event;
   storing, to a computer readable medium, segment data relating to the plurality of content segments identified within the event, such that the segment data is stored in association with the media object, such that the segment data identifies the plurality of content segments within the media object;

analyzing, using the computing device, the plurality of topic messages to identify a key actor related to the event;

extracting, using the computing device, key actor data from the analyzed topic messages; and storing, to the computer readable medium, the key actor data relating to the key actor in the event, wherein the key actor data is stored in association with the media object, the key actor data identifying the key actor in the event.

2. The method of claim 1 wherein the plurality of content segments are identified using a plurality of extrema identified in a volume of topic messages relating to the event.

3. The method of claim 2 wherein the plurality of extrema are identified using a discrete function of time in a fixed time interval.

4. The method of claim 2 wherein the plurality of extrema are identified using Newton's Method.

5. The method of claim 4 wherein the extrema are filtered to include only outliers that are one standard deviation away from the mean, $\mu \pm \sigma$, as measured in a fixed sliding window to the activity volume.

6. The method of claim 1 wherein the key actor is identified by determining an eigenvector centrality of the users mentioned in the text of the plurality of topic messages.

7. The method of claim 6 wherein the eigenvector centrality is computed using the accelerated power method.

8. The method of claim 1 wherein the event is selected by a system administrator using an interface provided by the computing device.

9. The method of claim 1 wherein the event is automatically selected using a selection criteria.

10. The method of claim 9 wherein the selection criteria is selected from the list: event genre, event broadcaster, event sponsor.

11. The method of claim 1 wherein the topic message source is a social networking website.

12. The method of claim 1 wherein the topic message source is a microblogging website.

13. The method of claim 1 wherein topic messages associated with identifier relating to the event are retrieved from the topic message source.

14. The method of claim 13 wherein the identifier comprise a tag placed within the text of the message.

15. The method of claim 1 wherein segment data and the key actor data is stored in a database stored on the non-transitory computer-readable storage medium, wherein the database is accessible, over the network, to an application.

16. The method of claim 15 wherein the application is a web search application, wherein the web search application uses the key actor data to index the media object by key actor.

17. The method of claim 15 wherein the application is a web search application, wherein a media presentation service uses the segment data to allow users to view individual segments within the media object.

18. A system comprising:
a processor;
a storage medium for tangibly storing thereon program logic for execution by the processor, the program logic comprising:
logic executed by the processor for selecting an event such that at least a portion of the content of the event is stored as a media object;
logic executed by the processor for retrieving, over a network, a plurality of topic messages relating to the event from a plurality of topic message sources;
logic executed by the processor for analyzing the plurality of topic messages to identify a plurality of content segments within the event;
logic executed by the processor for storing, to a computer readable medium, segment data relating to the plurality of content segments identified within the event, such that the segment data is stored in association with the media object, such that the segment data identifies the plurality of content segments within the media object;
logic executed by the processor for analyzing the plurality of topic messages to identify a key actor related to the event; and
logic executed by the processor for extracting key actor data from the analyzed topic messages; and
logic executed by the processor for storing, to the computer readable medium, the key actor data relating to the key actor in the event, wherein the key actor data is stored in association with the media object, the key actor data identifying the key actor in the event.

19. The system of claim 18 wherein the plurality of content segments are identified using a plurality of extrema identified in a volume of topic messages relating to the event.

20. The system of claim 19 wherein the plurality of extrema are identified using a discrete function of time in a fixed time interval.

21. The system of claim 19 wherein the plurality of extrema are determined using Newton's Method.

22. The system of claim 21 wherein the extrema are filtered to include only outliers that are one standard deviation away from the mean, $\mu \pm \sigma$, as measured in a fixed sliding window to the activity volume.

23. The system of claim 18 wherein the key actor is identified by determining an eigenvector centrality of the users mentioned in the text of the plurality of topic messages.

24. The system of claim 23 wherein the eigenvector centrality is computed using the accelerated power method.

25. A non-transitory computer-readable storage medium having computer-executable instructions for a method comprising the steps of:
selecting an event, such that at least a portion of the content of the event is stored as a media object;
retrieving, over a network, a plurality of topic messages relating to the event from topic message source;
analyzing the plurality of topic messages to identify a plurality of content segments within the event;
storing, to a second computer readable medium, segment data relating to the plurality of content segments identified within the event, such that the segment data is stored in association with the media object, such that the segment data identifies the plurality of content segments within the media object;
analyzing the plurality of topic messages to identify a key actor related to the event;
extracting key actor data from the analyzed topic messages; and
storing, to the second computer readable medium, the key actor data relating to the key actor in the event, wherein the key actor data is stored in association with the media object, the key actor data identifying the key actor in the event.

26. The non-transitory computer-readable storage medium of claim 25 wherein the plurality of content segments are identified using a plurality of extrema identified in a volume of topic messages relating to the event.

27. The non-transitory computer-readable storage medium of claim 26 wherein the plurality of extrema are identified using a discrete function of time in a fixed time interval.

28. The non-transitory computer-readable storage medium of claim 26 wherein the plurality of extrema are identified using Newton's method.

29. The non-transitory computer-readable storage medium of claim 28 wherein the extrema are filtered to include only outliers that are one standard deviation away from the mean, $\mu \pm \sigma$, as measured in a fixed sliding window to the activity volume.

30. The non-transitory computer-readable storage medium of claim 25 wherein the key actor is identified by determining an eigenvector centrality of the users mentioned in the text of the plurality of topic messages.

31. The non-transitory computer readable storage medium of claim 30 wherein the eigenvector centrality is computed using the accelerated power method.

* * * * *